(12) United States Patent
Pison et al.

(10) Patent No.: US 10,051,589 B2
(45) Date of Patent: Aug. 14, 2018

(54) SUSPENDING EMISSION OF A SIGNAL

(71) Applicant: AIRBUS DS SAS, Elancourt (FR)

(72) Inventors: Laurent Pison, Jouars Ponchartrain (FR); Frédéric Risy, Boulogne Billancourt (FR); Arthur Lallet, La Flamengrie (FR); Hervé Gromat, Bois d'Arcy (FR)

(73) Assignee: AIRBUS DS SAS, Elancourt (FR)

( * ) Notice: Subject to any disclaimer, the term of this patent is extended or adjusted under 35 U.S.C. 154(b) by 0 days.

(21) Appl. No.: 15/105,338

(22) PCT Filed: Nov. 7, 2014

(86) PCT No.: PCT/EP2014/002978
§ 371 (c)(1),
(2) Date: Jun. 16, 2016

(87) PCT Pub. No.: WO2015/090491
PCT Pub. Date: Jun. 25, 2015

(65) Prior Publication Data
US 2016/0309431 A1 Oct. 20, 2016

(30) Foreign Application Priority Data
Dec. 20, 2013 (FR) ...................................... 13 03053

(51) Int. Cl.
*H04W 56/00* (2009.01)
*H04W 40/02* (2009.01)
(Continued)

(52) U.S. Cl.
CPC ......... *H04W 56/001* (2013.01); *H04W 40/02* (2013.01); *H04W 72/1215* (2013.01); *H04W 16/14* (2013.01); *H04W 88/04* (2013.01)

(58) Field of Classification Search
CPC ............... H04W 56/001; H04W 40/02; H04W 72/1215; H04W 88/04; H04W 16/14
See application file for complete search history.

(56) References Cited

U.S. PATENT DOCUMENTS

2011/0243047 A1 10/2011 Dayal et al.
2013/0308453 A1* 11/2013 Cook ...................... H04L 41/32
370/235
2014/0177457 A1* 6/2014 Grosspietsch ........ H04W 24/02
370/252

FOREIGN PATENT DOCUMENTS

FR 2 979 045 A1 2/2013
WO WO 2014/099297 A1 6/2014

OTHER PUBLICATIONS

English Translation of FR2979045, [database online], [retrieved on Aug. 3, 2017] Retrieved from Espacenet using Internet <URL: http://translationportal.epo.org/emtp/translate/?ACTION=description-retrieval&COUNTRY=FR&ENGINE=google&FORMAT=docdb&KIND=A1&LOCALE=en_EP&NUMBER=2979045&OPS=ops.epo.org/3.2&SRCLANG=fr&TRGLANG=en>. pp. 1-5.*
(Continued)

*Primary Examiner* — Omar J Ghowrwal
(74) *Attorney, Agent, or Firm* — Pillsbury Winthrop Shaw Pittman LLP

(57) ABSTRACT

A communication method of a first device over a first radio communication link of a first communication network and a second device over a second radio communication link of a second communication network, includes a step of suspending, during a suspension time interval, transmission of a first signal by the first device over the first radio communication link; and a step of receiving, with the second device, a second signal over the second radio communication link during the suspension time interval.

5 Claims, 5 Drawing Sheets

(51) Int. Cl.
*H04W 72/12* (2009.01)
*H04W 88/04* (2009.01)
*H04W 16/14* (2009.01)

(56) References Cited

OTHER PUBLICATIONS

English Translation of PCT/EP2014/002978 Written Opinion, [database online], [retrieved on Aug. 3, 2017] Retrieved from Patentscope using Internet <URL: https://patentscope.wipo.int/search/docservicepdf_pct/id00000033830660/ETWOS/WO2015090491.pdf>. pp. 1-9.*
International Search Report as issued in International Patent Application No. PCT/EP2014/002978, dated Jan. 28, 2015.

* cited by examiner

SUSPENDING EMISSION OF A SIGNAL

CROSS REFERENCE TO RELATED APPLICATIONS

This application is the U.S. National Stage of PCT/EP2014/002978, filed Nov. 7, 2014, which in turn claims priority to French Patent Application No. 13 03053 filed Dec. 20, 2013, the entire contents of all applications are incorporated herein by reference in their entireties.

TECHNICAL FIELD AND SUBJECT MATTER OF THE INVENTION

The present invention relates to the field of telecommunications and more particularly relates to a method and a communication system enabling a plurality of devices to exchange data simultaneously and in an asynchronous manner over radio communication links without interfering with each other.

STATE OF THE PRIOR ART

A telecommunications system may include in a known manner a first device configured to emit a first signal over a first radio communication link of a first communication network and a second device configured to receive a second signal over a second radio communication link of a second communication network.

As an example, the first communication network may be a broadband network of 3G or 4G type and the second communication network may be a narrowband or broadband private mobile radio (PMR) network, used for example for public services (police, fire fighters, ambulances, etc.), these types of networks being known to those skilled in the art.

The first device emits the first signal over a first frequency band used by the first communication network and the second device receives the second signal over a second frequency band used by the second communication network. In addition, when the second device is a PMR device (narrowband or broadband), it generally merely monitors the second radio communication link in order to receive a second signal.

Nowadays, it is known to use radio frequency bands at least in part common to the first communication network and to the second communication network or very close to each other.

In this case, when the first device emits a first signal over the first radio communication link, it can create interferences which can degrade a second signal, received by the second device over the second radio communication link, when the second device is located near to the first device, for example when they are spaced apart by a distance of less than 1 meter or even 5 meters depending on the emission power of the devices.

A known solution for resolving this problem consists in authorizing the first device to emit a first signal during a first known time interval of the second device and to authorize in the same way the second device to receive a second signal over the second radio communication link during a known second time interval of the first device and distinct from the first time interval.

Such a solution thus requires a synchronisation between the first device and the second device in order that, on the one hand, the first device can determine the time interval during which it can emit a first signal and, on the other hand, the second device can determine the time interval during which it can receive a second signal.

Such a synchronisation is however complex and costly to implement, which is an important drawback.

GENERAL DESCRIPTION OF THE INVENTION

The present invention aims to overcome this drawback by providing a communication method enabling the first device to emit a first signal while at the same time enabling the second device to receive a non-degraded signal without it being necessary to carry out a synchronisation between the first device and the second device.

To this end, the invention firstly relates to a communication method of a first device over a first radio communication link of a first communication network, on the one hand, and of a second device over a second radio communication link of a second communication network, on the other hand, said method being noteworthy in that it includes a step of suspension, during a suspension time interval, of an emission of a first signal by the first device over the first radio communication link and a step of reception of a second signal by the second device over the second radio communication link during said suspension time interval.

Thus, with the method according to the invention, the first device does not emit a first signal over the first radio communication link during the suspension time interval such that it does not create radio interferences during said suspension time interval for the second device which can thus receive a second non-degraded signal over the second communication link.

It is thus no longer necessary for the second device to know the suspension time interval such that the first device and the second device operate in an asynchronous manner. In other words, the first device and the second device do not need to be synchronized with each other and the second device notably does not need to know the time intervals over which the first device emits a first signal over the first radio communication link.

Preferably, the suspension time interval is predetermined for the first device and/or is periodic.

Also preferably, the duration of the suspension time interval is comprised between several milliseconds and several hundreds of milliseconds, for example between 10 ms to 200 ms.

In a preferred manner, the method includes a step of resumption of the emission of the first signal by the first device over the first radio communication link after the end of the suspension time interval.

According to an aspect of the invention, the first signal including a plurality of data packets, the step of suspension includes the storage of said plurality of data packets during the suspension time interval.

According to another aspect of the invention, the first signal including a plurality of data packets, the step of suspension includes the destruction at least in part of said plurality of data packets during the suspension time interval.

The storage and/or the destruction of the data packets has for consequence the suspension of the emission of the first signal, that is to say the interruption of the radio transmission over the first radio communication link.

Advantageously, the step of resumption includes the emission of the plurality of stored data packets.

In a mode of implementation, the method includes, subsequently to the reception of the second signal, a step of interruption of the emission of the first signal during an interruption time interval, the duration of which is preferably greater than the duration of the suspension time interval, and, the second device also being configured to emit a third signal, a step of emission of said third signal by the second device during said interruption time interval.

Thus, for example, when it is necessary for the second device to respond to a message received in the second signal, the first device may advantageously be interrupted during an interruption time interval corresponding to the duration of the emission of the third signal by the second device.

The invention also relates to a communication device configured to receive a plurality of data packets, said device being noteworthy in that it includes an emission suspension module configured to suspend, during a suspension time interval, an emission of a signal by a first device over a first radio communication link of a first communication network such that a second device can receive a second signal over a second radio communication link of a second communication network during said suspension time interval.

In a form of embodiment, the device is a user device.

In another form of embodiment, the communication device is a relay node, preferably mobile, configured to receive a plurality of data packets of at least one user device and to transmit the data packets stored by the emission suspension module to the first device.

Preferably, the communication device is merged with the first device.

The invention also relates to a communication system including a first communication network, a first device configured to emit a first signal over a first radio communication link of said first communication network, a second communication network and a second device configured to receive a second signal over a second radio communication link of said second communication network, said system being noteworthy in that it includes an emission suspension module configured to suspend, during a suspension time interval, an emission of a first signal by the first device over the first radio communication link, the second device being configured to receive a second signal over the second radio communication link during said suspension time interval.

The first communication network and the second communication network share all or part of a same frequency band or use close (i.e. adjacent) frequency bands.

The first communication network may be a broadband communication network of type 3G (for example 3GPP UMTS), 4G (for example 3GPP LTE or 3GPP LTE-Advanced), broadband private mobile radio (PMR), WI-FI, (i.e. technology for wireless local area networking with devices based on the IEEE 802.11 standards), etc., or a narrowband communication network, for example of type TETRA 450, CDMA 450, etc.

The second communication network may be a narrowband communication network of private mobile radio (PMR) network type, for example of type TETRA, TETRA 450, Tetrapol, P25, CDMA 450, etc., or a broadband communication network of type private mobile radio network, WI-FI, (i.e. technology for wireless local area networking with devices based on the IEEE 802.11 standards), 3G, 4G, etc.

Advantageously, the system includes a third device, configured to communicate with the first device over a third communication link of the first communication network, and a fourth device, configured to communicate with the second device over a fourth radio communication link of the second communication network.

In this case, the first device is notably configured to emit a first signal over the first radio communication link to the third device and the second device is configured to receive over the second radio communication link a second signal transmitted by the fourth device.

According to an aspect of the invention, the emission suspension module is configured to store and/or destroy data packets, preferably IP data packets, during the suspension time interval.

Preferably, the suspension module comprises a buffer memory for storing IP data packets. The delay potentially induced by the filling and the emptying of such a memory over the emission of the first signal by the first device has no impact on the second device when it remains small given that the first device and the second device operate in an asynchronous manner.

In a preferred manner, the first device includes the emission suspension module.

In a form of embodiment of the system according to the invention, the first device and the second device are merged in a single device.

In a form of embodiment, the first device is a user device.

In another form of embodiment, the system includes at least one fifth device and the first device is a relay node, preferably mobile, configured to receive data packets of said fifth device over at least one fifth communication link.

Advantageously, the relay node includes a router configured to shunt data packets from or to the fifth device.

The fifth device may be a user device of telephone or computer type or instead a server. The fifth device may include a router configured to transmit data packets, preferably of IP type. The fifth communication link may be a wireless communication link, for example of WI-FI type (i.e. technology for wireless local area networking with devices based on the IEEE 802.11 standards), or instead a wire link, for example of Ethernet or USB type known to those skilled in the art.

In an alternative form of embodiment, the system includes at least one fifth device and a sixth device, said fifth device being configured to send data packets to the sixth device, the sixth device including the emission suspension module and a router, configured to shunt data packets received from the sixth device to the first device.

Other characteristics and advantages of the invention will become clear from the description that is made with reference to the appended figures given as non-limiting examples and in which identical references are given to similar objects.

DETAILED DESCRIPTION OF THE INVENTION

Figure 1:
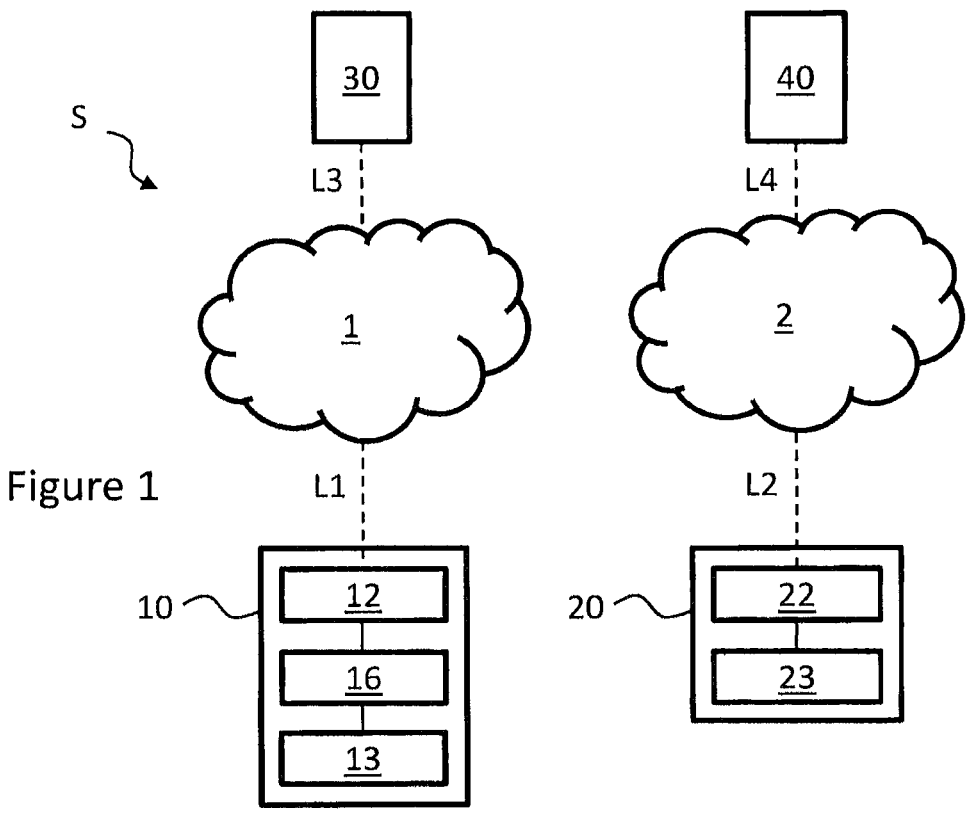
FIG. 1 illustrates a first form of embodiment of the system according to the invention.

I. System S According to the Invention

In FIGS. 1 to 5 are represented four forms of embodiment of the communication system S according to the invention.

In these different forms of embodiment, the communication system S includes a first communication network 1, a second communication network 2, a first device 10, a second device 20, a third device 30 and a fourth device 40.

The first device 10 and the third device 30 are configured to communicate with each other via the first communication network 1. To this end, the first device 10 is linked to the first communication network 1 by a first radio communication link L1 and the third device 30 is linked to the first communication network 1 by a third radio communication link L3.

Similarly, the second device 20 and the fourth device 40 are configured to communicate with each other via the second communication network 2. To this end, the second device 20 is linked to the second communication network 2 by a second radio communication link L2 and the fourth device 30 is linked to the second communication network 2 by a fourth radio communication link L4.

In this example, the first communication network 1 is a broadband communication network, for example of type 3GPP UMTS or 3GPP LTE or LTE-Advanced which communicates for example over the broad band of frequencies [380, 430] MHz. Such a first communication network 1 includes in a manner known to those skilled in the art a plurality of base stations linked together by servers (not represented) enabling the first device 10 and the third device 30 to communicate.

The first device 10 includes a first broadband transmission module 12 including a modem configured to emit and/or receive a first signal over the first radio communication link L1 of the broadband communication network 1. This first signal includes information items grouped together into data packets suited to be routed in the broadband communication network 1 according to the Internet Protocol (IP). Such data packets are commonly called IP data packets.

The first device 10 may be a user device, a relay node or a simple modem.

In order to generate these IP data packets, the system S according to the invention includes a generation module 13 of IP data packets intended to be sent in the first signal.

The third device 30 may be a user device or instead a server, for example an application server, linked to the first communication network 1 and with which the first device 10 can exchange IP data packets. A single third device 30 has been represented in FIGS. 1 to 5 but it goes without saying that a plurality of third devices 30 may be linked to the first communication network 1 in order to communicate with the first device 10.

Still in this example, the second communication network 2 is a narrowband communication network of private mobile radio (PMR) type, for example a TETRA or TETRAPOL communication network. Such a second communication network 2 includes in a manner known to those skilled in the art a radio interface enabling the second device 20 and the fourth device 40 to communicate in a so-called "narrow" frequency band, for example 2×5 MHz and comprised in the broad band of frequencies [380, 430] MHz used by the first device 10 to communicate over the radio communication link L1.

The second device 20 includes a second transmission module 22 including a modem configured to emit and/or receive a second signal over a radio communication link L2 of the narrowband communication network 2.

The second device 20 also includes a processing module 23 configured to process a second signal received by the second transmission module 22.

The second device 20 is preferably a user device, without this limiting the scope of the present invention.

The narrowband frequency band used by the second communication network 20 is comprised at least partially in the broad frequency band used by the first communication network 10.

The fourth device 40 may be a user device for example of PMR terminal or PMR dual terminal type or instead a base station or a radio relay node. A PMR dual terminal is a single terminal which is both configured to transmit a broadband signal over a radio communication link of a broadband communication network and a narrowband signal over a radio communication link of a narrowband communication network. A single fourth device 40 has been represented in FIGS. 1 to 5 but it goes without saying that a plurality of fourth devices 40 may be linked to the second communication network 2 in order to communicate with the second device 20.

According to the invention, the communication system S includes an emission suspension module 16 configured to suspend, during a suspension time interval, an emission of a first signal by the first device 10 over the first radio communication link L1, the second device 20 then being configured to receive a second signal over the second radio communication link L2 during said suspension time interval.

The duration of the suspension time interval is preferably comprised between 10 ms to 200 ms so as to enable the reception of a second signal such as, for example, an emergency signal called "out of coverage" signal known to those skilled in the art in PMR communication networks.

In the forms of embodiment illustrated in FIGS. 1 to 5, the emission suspension module 16 is configured to store the IP data packets, for example in a buffer memory, during the duration of a suspension time interval and to transmit the stored IP data packets to the first transmission module 12 after the end of a suspension time interval.

The emission suspension module 16 may also be configured to destroy all or part of the IP data packets during the suspension time interval.

Preferably, the emission suspension module 16 is configured to detect the start and the end of a suspension time interval.

In order to intercept the IP data packets to store them, the emission suspension module 16 may include an intermediate layer arranged between the modem (hardware layer) of the first transmission module 12 and the Transport Control Protocol/Internet Protocol (TCP/IP) stack known to those skilled in the art or instead may include a modified TCP/IP stack making it possible to store the IP data packets in a buffer memory during the suspension time interval.

a) First Form of Embodiment (FIG. 1)

In this form of embodiment, the first device 10 is a user device, for example of smartphone type, which includes the emission suspension module 16 and the generation module 13 of IP data packets.

Figure 2:
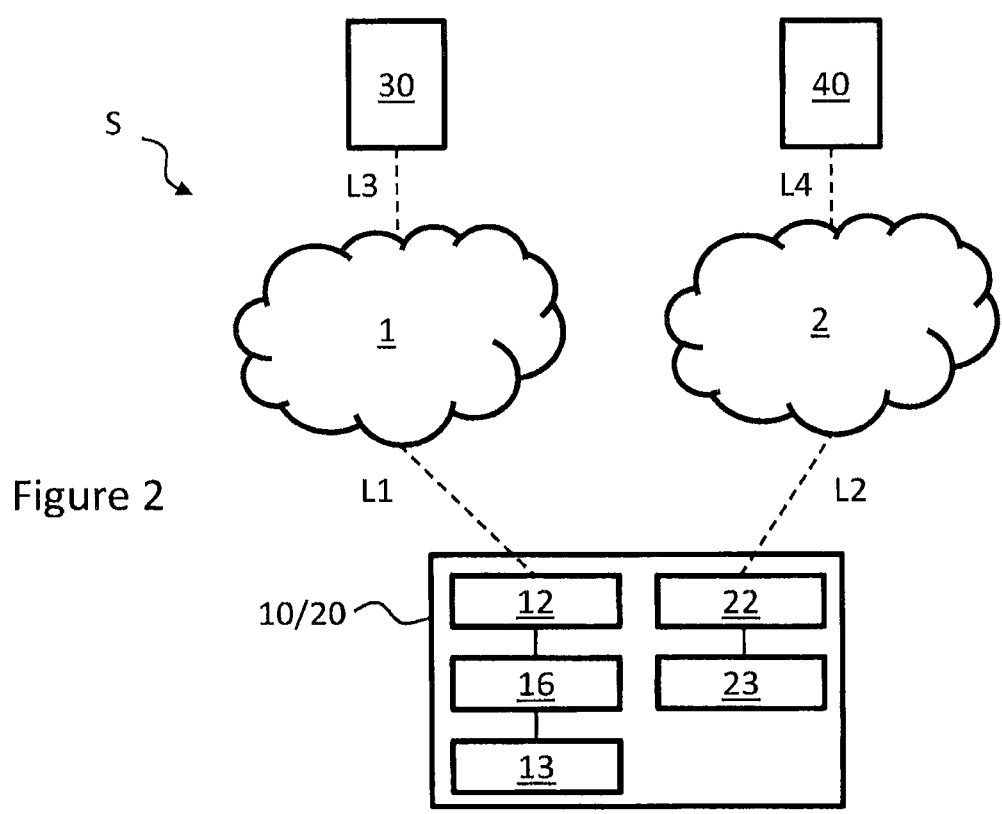
FIG. 2 illustrates a second form of embodiment of the system according to the invention.

The second device 20 is a user device, for example of PMR terminal type.

b) Second Form of Embodiment (FIG. 2)

Figure 3:
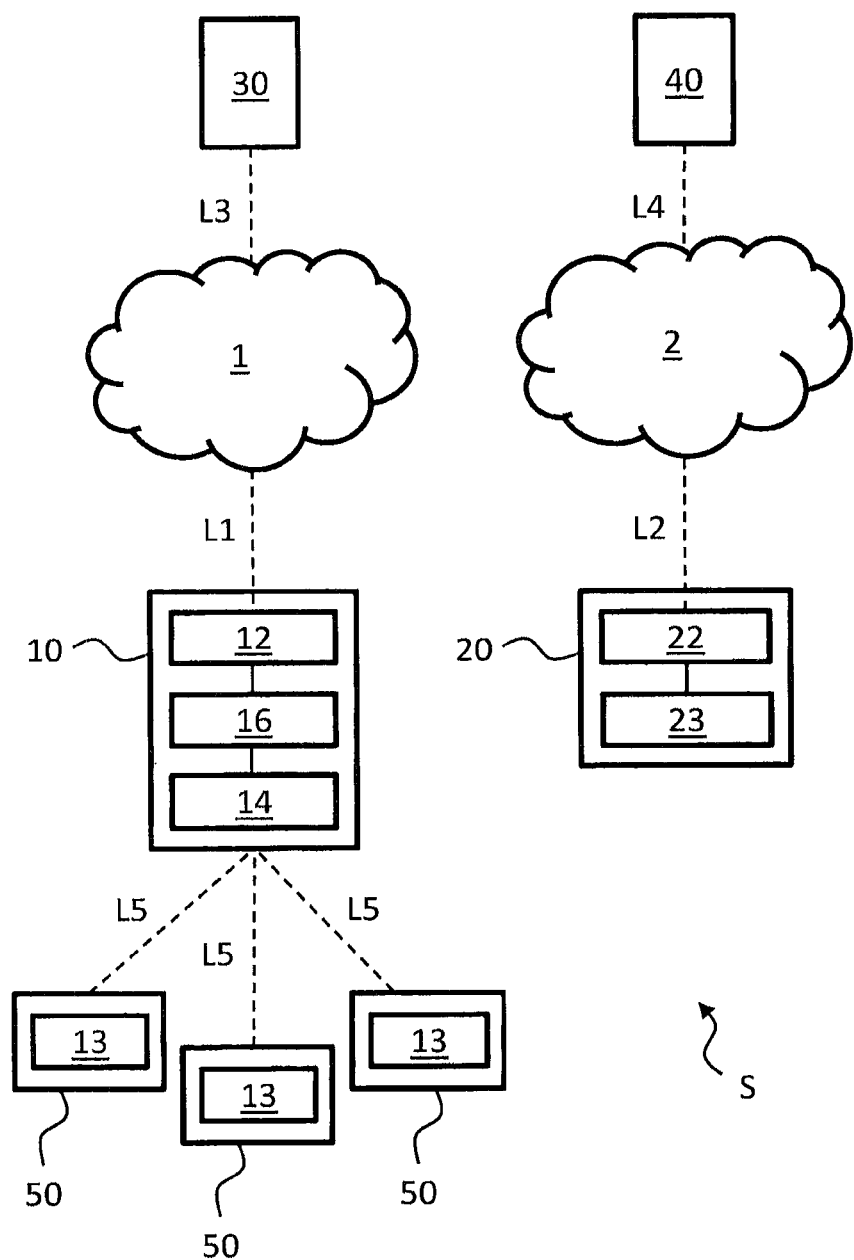
FIG. 3 illustrates a third form of embodiment of the system according to the invention.

In this form of embodiment, the first device 10 and the second device 20 are merged in a single device 10/20 which are in the form of a PMR dual terminal including the emission suspension module 16.

c) Third Form of Embodiment (FIG. 3)

In this form of embodiment, the first device 10 is a mobile relay node which includes the emission suspension module 16 and a generation module 13 of IP data packets.

The second device 20 is a user device, for example of PMR terminal type.

The system S includes a plurality of fifth devices 50 and the relay node 10 is configured to communicate with said plurality of fifth devices 50 over a plurality of fifth communication links L5.

More precisely, each fifth device 50 includes a generation module 13 of IP data packets and is configured to send said packets to the relay node 10 over a fifth communication link L5 in order that the relay node 10 transmits them, in one or more first signals, over the radio communication link L1 of the broadband communication network 1 to the third device 30.

The fifth devices 50 are preferably user devices, for example of smartphone, PC, tablet type, etc. The fifth communication links L5 may be wire links, for example of Ethernet type well known to those skilled in the art, and/or radio communication links, for example of WI-FI type (i.e. technology for wireless local area networking with devices based on the IEEE 802.11 standards) also well known to those skilled in the art.

In order to route the IP data packets from or to the fifth devices 50, the relay node 10 includes an IP router 14 known to those skilled in the art. The plurality of fifth devices 50 is for example linked to the router 14 in a network of Local Area Network (LAN) or Wireless Local Area Network (WLAN) type.

Figure 4:
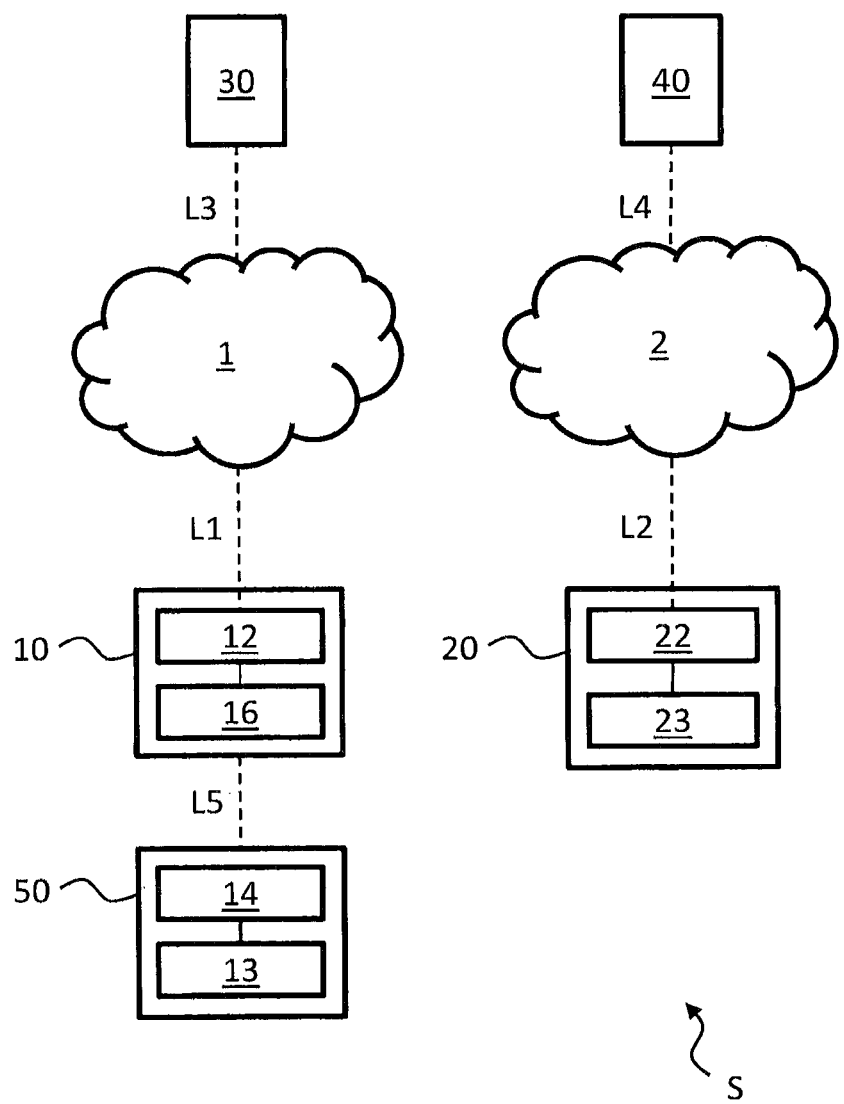
FIG. 4 illustrates a fourth form of embodiment of the system according to the invention.

In particular, this IP router 14 is configured to route IP data packets received from the fifth devices 50 to the emission suspension module 16.

d) Fourth Form of Embodiment (FIG. 4)

In this form of embodiment, the first device 10 is a mobile relay node that includes the emission suspension module 16.

The second device 20 is a user device, for example of PMR terminal type.

The system S includes a fifth device 50 and the relay node 10 is configured to communicate with said fifth device 50 over a fifth communication link L5 which may be, for example an Ethernet or USB cable.

Figure 5:
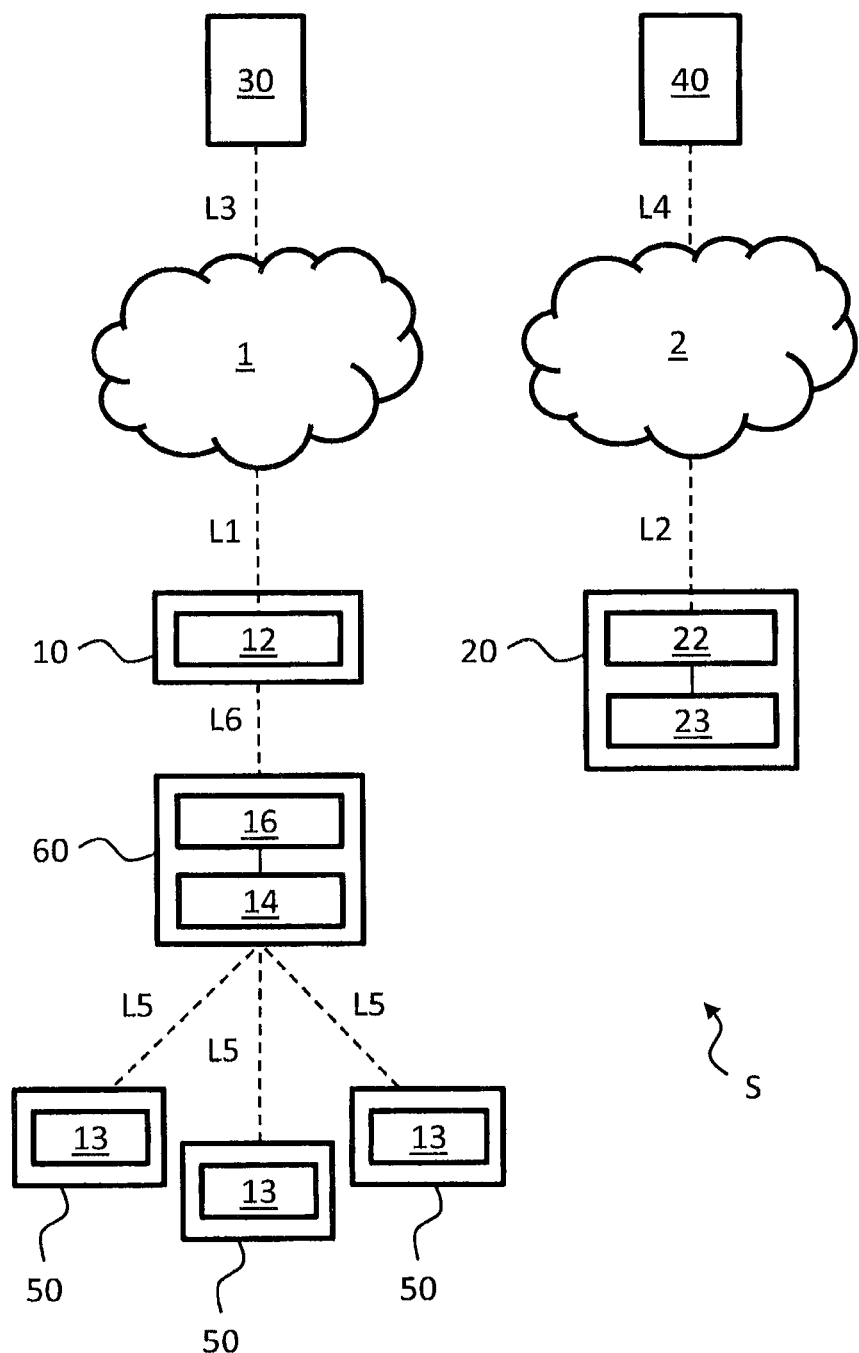
FIG. 5 illustrates a fifth form of embodiment of the system according to the invention.
Figure 6:
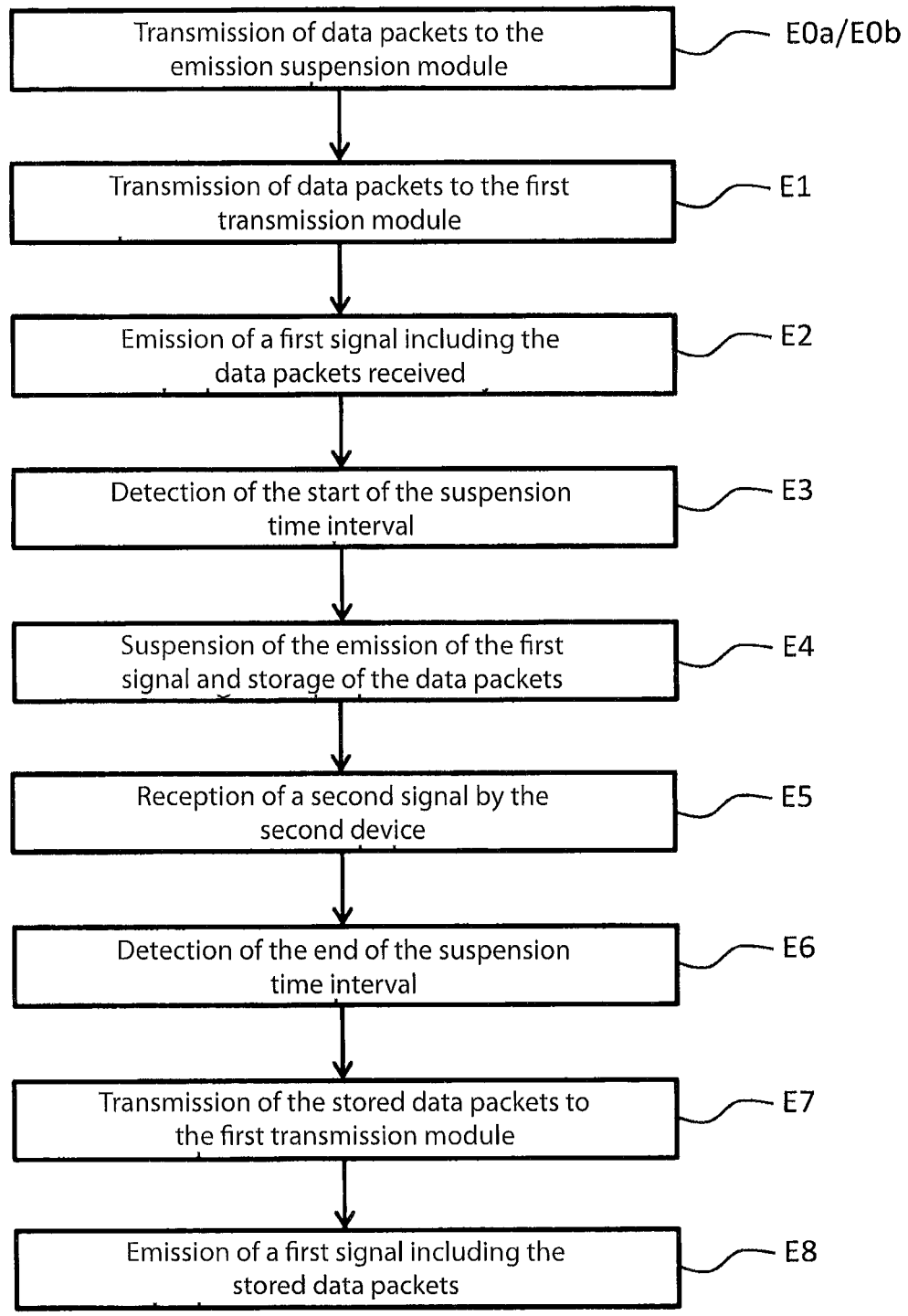
FIG. 6 illustrates a mode of implementation of the method according to the invention.

The fifth device 50 includes a generation module 13 of IP data packets and an IP router 14 configured to route the IP data packets 10 generated by the generation module 13 to the first device 10.

e) Fifth Form of Embodiment (FIG. 5)

In this form of embodiment, the first device 10 is a modem including the first transmission module 12.

The second device 20 is a user device, for example of PMR terminal type.

The system S includes a plurality of fifth devices 50 and a sixth device 60.

The plurality of fifth devices 50 is configured to communicate with said sixth device 60 over a plurality of fifth communication links L5.

More precisely, each fifth device 50 includes a generation module 13 of IP data packets and is configured to send said packets to the relay node 10 over a fifth communication link L5 in order that the relay node 10 transmits them, in one or more first signals, over the radio communication link L1 of the broadband communication network 1 to the third device 30.

The fifth devices 50 are preferably user devices, for example of smartphone, PC, tablet type, etc. The fifth communication links L5 may be wire links, for example of Ethernet type well known to those skilled in the art, and/or radio communication links, for example of WI-FI type (i.e. technology for wireless local area networking with devices based on the IEEE 802.11 standards)also well known to those skilled in the art.

In order to route the IP data packets from or to the fifth devices 50, the sixth device 60 includes an IP router 14 known to those skilled in the art. The plurality of fifth devices 50 is for example linked to the router 14 in a network of Local Area Network (LAN) or Wireless Local Area Network (WLAN) type.

In particular, this IP router 14 is configured to route IP data packets received from the fifth devices 50 to the emission suspension module 16.

The sixth device 60 is moreover configured to transmit IP data packets stored by the emission suspension module 16 to the first device 10 over a sixth communication link L6, which may be wired or wireless.

II. Implementation of the Invention

An example of implementation is described hereafter with reference to FIG. 5 for each form of embodiment of the system according to the invention detailed beforehand.

In the first form and the second form of embodiment of the system according to the invention, the first device 10 generates, via its generation module 13, IP data packets intended to be sent to the third device 30 and transmits them in a step E0a to the emission suspension module 16.

In the third form, the fourth form and the fifth form of embodiment of the system according to the invention, the fifth device(s) 50 generate, via their generation module 13, and send, in a step E0b, IP data packets, intended to be sent to the third device 30, to the router 14 which transmits them to the emission suspension module 16.

In the five forms of embodiment illustrated of the system S according to the invention, the emission suspension module 16 of the first device 10 transmits to the first transmission module 12, in a step E1, IP data packets intended to be sent to the third device 30 as long as the start of a suspension time interval has not been detected.

The first transmission module 12 emits in a step E2 a first signal 5 including said IP data packets over the first radio communication link L1 of the broadband communication network 1 to the third device 30.

In a step E3, the emission suspension module 16 detects the start of a suspension time interval and stores, in a step E4, the IP data packets intended to be sent to the third device 30.

During this suspension interval, according to the invention, the first emission module 12 does not emit a first signal over the first radio communication link L1 of the broadband communication network 1 such that the second device 20 can receive, in a step E5, on its second transmission module 22 a second signal emitted by the fourth device 40 over the second radio communication link L2 of the second communication network 2 without this second signal being degraded by interferences caused by an emission of a first signal over the first radio communication link L1 by the first device 10.

The emission suspension module 16 then detects, in a step E6, the end of the suspension time interval then next transmits in a step E7 the IP data packets to the first transmission module 12 so that it emits in a step E8 a first signal, including said IP data packets stored during the suspension time interval, over the first radio communication link L1 of the broadband communication network 1 to the third device 30.

The invention thus advantageously enables a first broadband communication device 10 to emit a first signal by intermittence such that a second narrowband communication device 20 situated near to said first device 10 can receive a second signal non-degraded by interferences caused by the emission of the first signal by the first device.

The invention is particularly advantageous in the sense that the first device 10 and the second device 20 do not need to be synchronized with each other, which makes the system according to the invention both simple and efficient.

When the second device 20 receives, in the second signal, a message necessitating a response by it, the method according to the invention may include, subsequently to the reception of said second signal, a step of interruption of the emission of the first signal by the first device 10 during an interruption time interval and a step of emission of a third signal by the second device 20 to the fourth device 40 during said interruption time interval.

This enables the second device 20 to be able to communicate with the fourth device 40, for example in the event of an emergency.

Obviously, other embodiments may also be envisaged. More particularly, the nature of the networks, devices and communication links may be different to those described without this limiting the scope of the present invention.

The invention claimed is:

1. A communication device comprising:
   an emission suspension module that includes a buffer memory configured to store, during a predetermined suspension time interval, a plurality of data packets of a first signal so as to suspend an emission of the first signal emitted by a first device over a first radio communication link of a first communication network such that a second device can receive a second signal over a second radio communication link of a second communication network during said predetermined suspension time interval,
   wherein the emission suspension module is configured to detect a beginning of the predetermined suspension time interval, which results in a storage of the plurality of data packets in said buffer memory, and
   wherein the communication device is included in the first device.

2. The communication device according to claim 1, wherein the first device is a telephone terminal or a computer.

3. The communication device according to claim 1, wherein the communication device is a relay node configured to receive a second plurality of packets from a user device external to the communication device.

4. A communication device comprising:
   an emission suspension module that includes a buffer memory configured to store, during a predetermined suspension time interval, a plurality of data packets of a first signal so as to suspend an emission of the first signal emitted by the communication device over a first radio communication link of a first communication network such that a second device can receive a second signal over a second radio communication link of a second communication network during said predetermined suspension time interval;
   a first modem configured to emit said first signal over the first radio communication link, and
   a data packet generation module coupled to the emission suspension module, said data generation module that generates said plurality of data packets to be sent in the first signal,
   wherein the emission suspension module is configured to detect a beginning of the predetermined suspension time interval, which results in a storage of the plurality of data packets in said buffer memory, and
   wherein the communication device is a dual terminal that comprises said second device, said second device including a second modem configured to receive said second signal over the second radio communication link.

5. A communication device comprising:
   an emission suspension module that includes a buffer memory configured to store, during a predetermined suspension time interval, a plurality of data packets of a first signal so as to suspend an emission of the first signal emitted by the communication device over a first radio communication link of a first communication network such that a second device can receive a second signal over a second radio communication link of a second communication network during said predetermined suspension time interval, and
   a first modem configured to emit said first signal over the first radio communication link,
   wherein the emission suspension module is configured to detect a beginning of the predetermined suspension time interval, which results in a storage of the plurality of data packets in said buffer memory, and
   wherein the communication device is a mobile relay node, said communication device further comprising a router configured to route data packets, which are emitted by one or more external devices to the communication device, to the emission suspension module.

* * * * *